United States Patent
Davidson et al.

(10) Patent No.: US 6,754,197 B1
(45) Date of Patent: Jun. 22, 2004

(54) METHOD AND SYSTEM FOR TRANSMIT DATA BLOCKING IN A WIRELESS COMMUNICATIONS NETWORK

(75) Inventors: Andrew M. Davidson, San Jose, CA (US); Tao-Fei S. Ng, Fremont, CA (US); Jeffrey Scott Kuskin, Mountain View, CA (US); Deepak Prabhakar Dhamdhere, San Jose, CA (US); Fiona J. Cain, San Jose, CA (US)

(73) Assignee: Atheros, Inc., Sunnyvale, CA (US)

( * ) Notice: Subject to any disclaimer, the term of this patent is extended or adjusted under 35 U.S.C. 154(b) by 428 days.

(21) Appl. No.: 09/663,102

(22) Filed: Sep. 15, 2000

(51) Int. Cl.[7] .......................... H04Q 7/24; H04L 12/28
(52) U.S. Cl. ...................................... 370/338; 370/394
(58) Field of Search ............................. 370/312, 328, 370/338, 346, 349, 389, 392, 394, 412

(56) References Cited

U.S. PATENT DOCUMENTS

| | | | | |
|---|---|---|---|---|
| 4,672,601 A | | 6/1987 | Ablay | 370/31 |
| 5,337,313 A | * | 8/1994 | Buchholz et al. | 370/394 |
| 5,444,718 A | * | 8/1995 | Ejzak et al. | 714/748 |
| 5,461,614 A | * | 10/1995 | Lindholm | 370/394 |
| 5,467,341 A | * | 11/1995 | Matsukane et al. | 714/708 |
| 5,555,266 A | * | 9/1996 | Buchholz et al. | 370/347 |
| 5,588,009 A | | 12/1996 | Will | 371/33 |
| 5,627,878 A | | 5/1997 | Strauch et al. | 379/58 |
| 5,644,576 A | * | 7/1997 | Bauchot et al. | 370/338 |
| 5,754,754 A | * | 5/1998 | Dudley et al. | 714/18 |
| 5,872,777 A | * | 2/1999 | Brailean et al. | 370/349 |
| 6,067,297 A | * | 5/2000 | Beach | 370/389 |
| 6,134,237 A | * | 10/2000 | Brailean et al. | 370/394 |
| 6,404,772 B1 | * | 6/2002 | Beach et al. | 370/338 |

\* cited by examiner

*Primary Examiner*—Andy Lee
(74) *Attorney, Agent, or Firm*—Pillsbury Winthrop LLP

(57) ABSTRACT

Systems and methods to provide ordered transmission of data packets to multiple destinations are presented. A transmission device includes a transmitter, a data packet ordering unit, a state table, and a transmit management interface such as a hardware/software unit. The state table stores a transmit block status of each destination. The transmit management interface is coupled to the transmitter and analyzes data packets. The transmit management interface determines whether to transmit a data packet targeted to a particular destination or to block transmission of data packets to the particular destination by examining the transmit block status of the particular destination from the state table.

30 Claims, 7 Drawing Sheets

| STA 1-1 | STA 2-1 | STA 2-2 | STA 3-1 | STA 1-2 | STA 3-2 |

| STA 2-1 | STA 2-2 | STA 3-1 | STA 3-2 | STA 1-1 | STA 1-2 |

↙ 700

FIG. 6B

METHOD AND SYSTEM FOR TRANSMIT DATA BLOCKING IN A WIRELESS COMMUNICATIONS NETWORK

FIELD OF THE INVENTION

The present invention is directed to communication systems and networks and is particularly directed toward sequential packet delivery and packet filtering in wireless transmission and communication systems.

BACKGROUND

In communications systems it is often desirable to guarantee in-order transmission of data, that is, to ensure that data elements transmitted from a source node are received at a destination node in the same order as the data elements were sent. In a communication system that supports a mechanism for queuing transmissions of data, but that also supports the retry of failed transmissions through manipulation and requeuing, in-order delivery presents additional complexities.

The Institute of Electrical and Electronic Engineers (IEEE) has established a wireless local area network (LAN) standard, 802.11. The IEEE 802.11 standard (IEEE 802.11) outlines Media Access Control (MAC) and Physical Layer (PHY) specifications for wireless LANs. The specification of the IEEE 802.11 addresses transmission of data in wireless LANs. The IEEE 802.11 specification requires in-order delivery so that a simple mechanism may be used to determine if duplicate data elements, such as data packets, are received at a given destination node. Sequential packet delivery is a critical aspect of IEEE 802.11 access points and stations. The IEEE 802.11 specification indicates that only one data packet intended for a particular receiver address may be queued at a time from a particular source address. That is, in-order delivery should be achieved by never queuing more than one data packet for a particular destination at a time. This prevents out-of-order delivery in the event that there is a failed transmission of a data packet.

FIG. 1 is a diagram illustrating an exemplary queue 100 of data packets 102–114 intended for transmission to a series of destinations A, B, and C. As an example of the reasoning behind the IEEE 802.11 restriction, assume that a data packet 102 intended for the destination A is queued mixed with data packets 104, 106, 114, 116 targeted for the destination B and with data packets 112, 116 for the destination C. Further assume that contrary to the IEEE 802.11 restriction, two or more data packets 102, 108, 110, 116 for destination A are interleaved with the data packets for the other destinations B and C. If multiple data packets are queued for destination A, then out of order delivery of data packets to destination A may occur if a failed transmission of the first data packet 102 occurs and transmission of data packets continues. Of course, transmission of data packets may be halted after a failed transmission so that any failed data packets can be manipulated and retransmitted. This practice is undesirable, however, because stopping data transmission to destination A also stops transmission to the other destinations, B and C, according to the example. It would be desirable to continue transmitting data packets for other destinations, in this case destinations B and C, even if a failed transmission of the first data packet for destination A occurs.

Meeting this restriction of the IEEE 802.11 specification, that is, one data packet per destination in the queue, would have a severe impact on system performance. For example, the time taken for the transmitter to recognize that a data packet has been successfully transmitted and to queue the next data packet for that destination will often exceed the time taken to exhaust the entire transmit queue.

Referring to FIG. 2, a typical IEEE 802.11 compliant device 200, such as an access point or a station, includes a transmitter 210, a memory 220, a local central processing unit (CPU) 230, and a bus interface unit (BIU) 240. The local CPU 230 transfers data packets from the BIU 240 into the memory 220. In addition, the CPU 230 queues data packets for the transmitter 210 so that the CPU 230 can control the order in which data packets are sent. The local CPU 230 has typically a low latency, meaning that to avoid severe impacts on performance, the CPU 230 may only queue the next packet for a particular destination once the previous packet is gone. Imagine a transmitter 210 that blindly sends all of the data packets that the CPU 230 queues for transmission. Then, if the CPU 230 queued at least two packets to the same destination, and a failed transmission of the first packet to the destination were to occur, then the transmitter might send the second packet to the destination before the device 200 could be notified that a failed transmission of the first packet occurred. If a failed transmission occurred, and if the second packet was subsequently successfully transmitted, then the destination node would of necessity receive the two packets out of order, thereby violating the in-order delivery requirement of IEEE 802.11.

Accordingly, it would be desirable to implement a system that maintains in-order delivery of packets to the same destination without sacrificing system performance.

SUMMARY

It is therefore an object of the invention to overcome the above-described problems and challenges.

The present invention fulfills this object and others by providing in a first aspect of the present invention a transmission device to provide ordered transmission of data packets to a plurality of destinations. The transmission device includes a transmitter, a data packet ordering unit, a state table, and a transmit management interface coupled to the transmitter and to the data packet ordering unit. The state table stores a transmit block status of each destination. The transmit management interface analyzes data packets and determines whether to transmit a data packet targeted to a particular destination or to block transmission of data packets to the particular destination by examining the transmit block status of the particular destination from the state table.

A transmission device to provide ordered transmission of data packets to a plurality of destinations according to a presently preferred embodiment is presented in a second aspect of the present invention. The transmission device includes a transmitter, a data packet ordering unit, a state table, and a transmit management interface coupled to the transmitter. The state table stores a transmit block status of each destination. The transmit management interface blocks transmission of data packets to a first destination while permitting transmission of data packets to a second destination in accordance with the respective transmit block statuses of the first destination and the second destination from the state table.

A method of providing ordered transmission of data packets to a plurality of destinations according to a presently preferred embodiment is presented in a third aspect of the present invention. At least one data packet targeted to a first destination is queued together with at least one data packet targeted to at least one other destination. Whether or not to transmit a data packet in accordance with a destination transmit block status table and a change destination status code is determined. The destination transmit block status table indicates whether a particular destination has a transmit block. The change destination status code is stored in the data packet. The change destination status code indicates whether a transmit block at a particular destination should be maintained.

Another method of providing ordered transmission of data packets to a plurality of destinations according to a presently preferred embodiment is presented in a fourth aspect of the present invention. At least one data packet targeted to a first destination is queued together with at least one data packet targeted to at least one other destination. Further transmission of any data packets to the one destination in the event of a failed transmission of a first data packet targeted to the one destination is blocked. Transmission of at least one other data packet targeted to at least one other destination is permitted.

Yet another method of providing ordered transmission of data packets to a plurality of destinations according to a fifth aspect of the present invention is presented. A transmission queue is provided and updated. The transmission queue initially includes at least one data packet targeted to one destination together with at least one data packet targeted to at least one other destination. Further transmission of any data packets to the one destination in the event of a failed transmission of a first data packet targeted to the one destination is blocked. Transmission of at least one other data packet targeted to at least one other destination is permitted.

BRIEF DESCRIPTION OF THE DRAWINGS

The foregoing and other features, aspects, and advantages will become more apparent from the following detailed description when read in conjunction with the following drawings, wherein:

FIG. 6A is a diagram illustrating an exemplary queue of data packets intended for transmission to a series of destinations STA 1, STA 2, and STA 3;

FIG. 6B is a diagram illustrating an exemplary queue of data packets intended for transmission to a series of destinations STA 1, STA 2, and STA 3 following requeuing of data packets;

DETAILED DESCRIPTION OF THE PRESENTLY PREFERRED EMBODIMENTS

The presently preferred embodiments address the IEEE 802.11 Standard in-order delivery requirement while allowing multiple data packets to be queued to the same destination by providing a system and method to dynamically block sends to a particular set of destination nodes while continuing to allow sends to other nodes to proceed until it is safe to resume sending to the blocked nodes.

The present invention will now be described in detail with reference to the accompanying drawings, which are provided as illustrative examples of preferred embodiments of the present invention.

Figure 3:
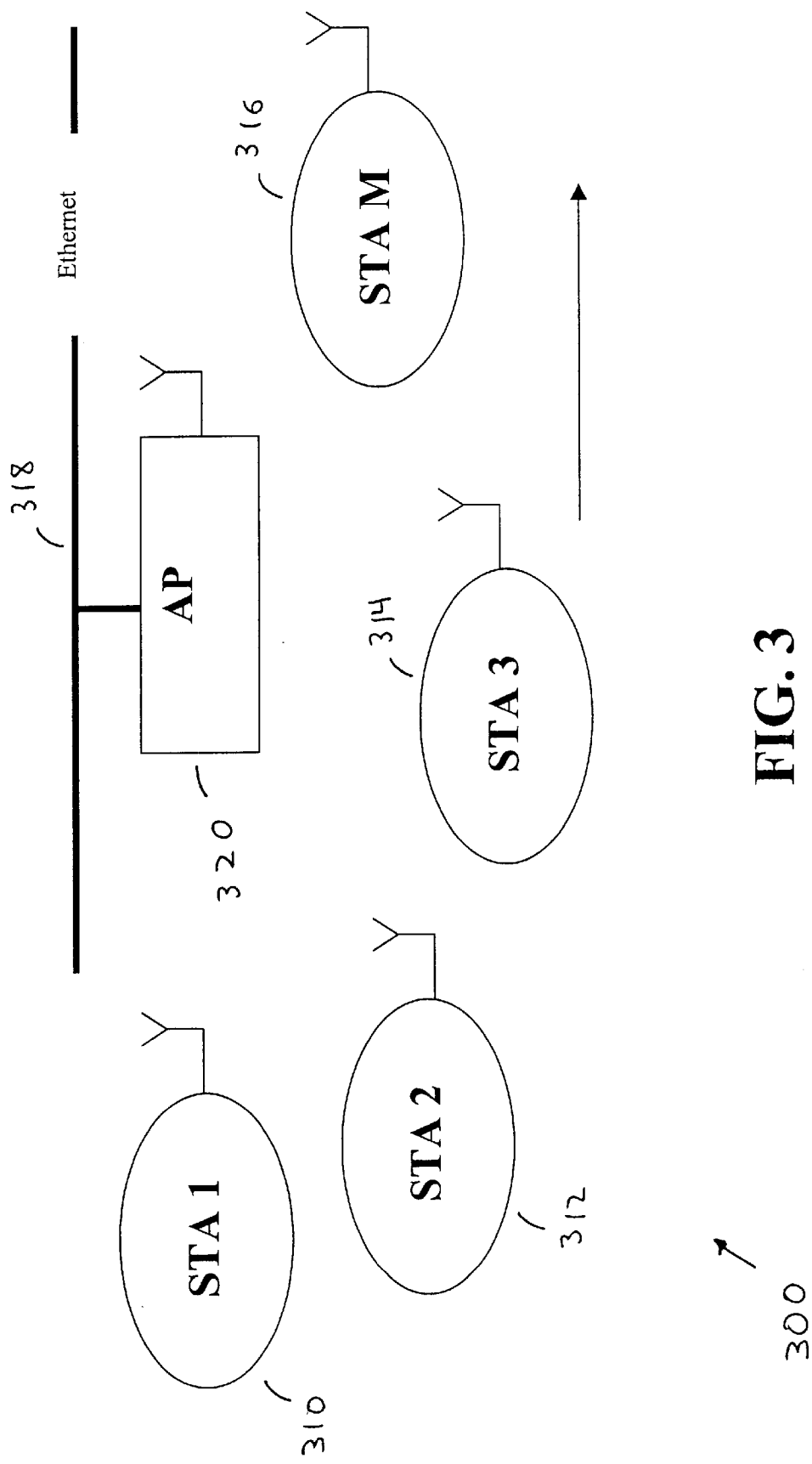
FIG. 3 is a diagram illustrating the structure of a first exemplary wireless communications network.

FIG. 3 is a diagram illustrating the structure of a first exemplary wireless networked communications system 300 that may incorporate a presently preferred embodiment described herein. The system 300 includes a plurality of client devices, or stations (STA) STA 1 310, STA 2 312, STA 3 314, to STA M 316, an access point (AP) 320, and a wired network 318, for example, an Ethernet LAN, coupled to the AP 320. The AP 320 is a device that serves to interface the wireless network of stations 310 . . . 316 with the wired network 318, in this case, the Ethernet LAN. As shown in FIG. 3, multiple stations 310 . . . 316 may connect to the wired network via the same AP 320. A wireless communications system such as system 300 allows mobility, so that, unlike a conventional wired network, users or stations such as stations 310 to 316 may move around yet remain connected to the wired network. Preferably, a receiver access point or station sends an acknowledgement for every directed data packet received back to a transmitter station or access point. A directed data packet refers to a data packet that is sent directly to a specific destination and thus requires an acknowledgement from the destination that uniquely receives the packet; rather than a data packet that is multicast to several destinations. In a presently preferred embodiment, a failed transmission occurs when a transmitter station or access point does not receive an acknowledgement, of receipt of a directed data packet, from a receiver access point or station. As a user or station moves physically away from an access point such as the AP 320, the signals to and from the access point become weaker and data packets are more likely to be lost due to noise. In the case of a failed transmission of a data packet, the station or access point can resend the data packet. In some cases, the station or access point may resend the data packet at a lower data rate to increase the probability that the data packet will be received correctly. If the data packet is resent from the access point to the station (or from the station to the access point), the data packet must be resent prior to any other data packets being sent to the same destination in order to satisfy the in-order transmission requirement of IEEE 802.11.

Figure 4:
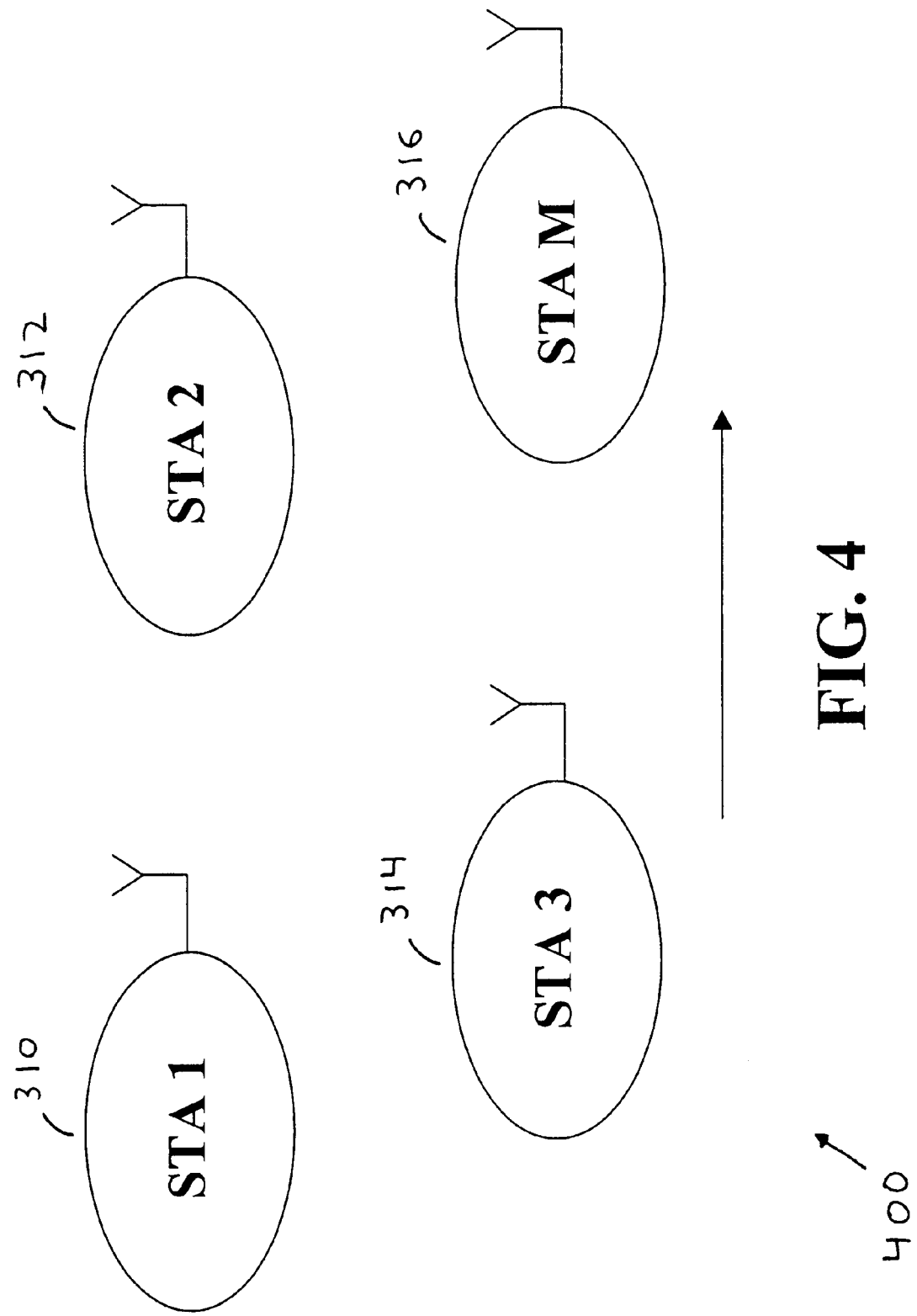
FIG. 4 is a diagram illustrating the structure of a second exemplary wireless communications network.

FIG. 4 is a diagram illustrating the structure of a second exemplary wireless networked communications system 400 that may incorporate a presently preferred embodiment described herein. The system 400 includes a plurality of client devices, or stations (STA) STA 1 310, STA 2 312, STA 3 314, to STA M 316. Contrasting this exemplary system 400 with the system 300 of FIG. 3, system 400 has only stations 310 . . . 316 and no access point. As is known in the art of wireless communications, this configuration is an ad hoc network. In this configuration, the stations such as stations 310 . . . 316 are only allowed to communicate with one another. As the physical distance between stations increases, the probability of a failed transmission between the stations increases. As with system 300, if a data packet is resent from one station of system 400 to another destination station following a failed transmission, the data packet must be resent prior to any other data packets being sent to the same destination station in order to satisfy the in-order transmission requirement of IEEE 802.11.

The exemplary wireless communication systems 300 of FIG. 3 and 400 of FIG. 4 preferably both embody aspects of the presently preferred method and systems described herein. The methods and systems will be described with reference to the exemplary systems 300, 400. Any station or access point such as those of wireless systems 300 and 400 can assume the position of a source transmitter or a destination receiver. For example, the access point AP 320 of system 300 in FIG. 3 is capable of acting as a source transmitter to transmit data packets to destination node stations STA 1 310, STA 2 312, and STA 3 314 in accordance with the presently preferred embodiments described herein. Similarly, the station STA 2 312 of system 400 in FIG. 4, for example, is capable of acting as a source transmitter to transmit data packets to destination node stations STA 1 310, STA 2 312, and STA M 316 in accordance with the presently preferred embodiments described herein.

Figure 1:
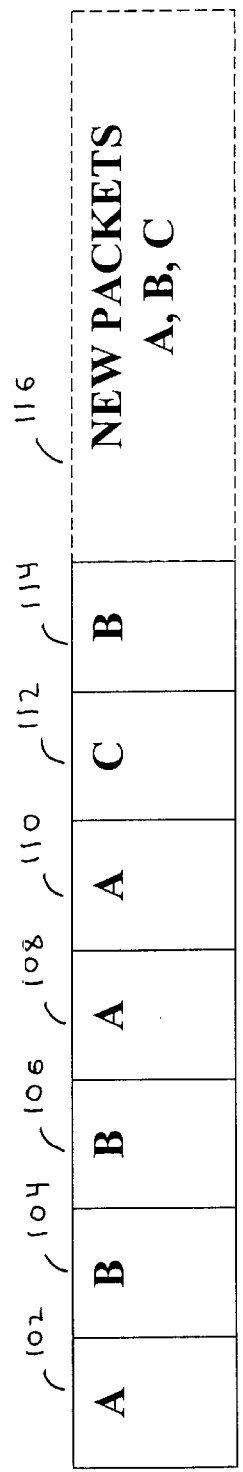
FIG. 1 is a diagram illustrating an exemplary queue of data packets intended for transmission to a series of destinations A, B, and C.
Figure 2:
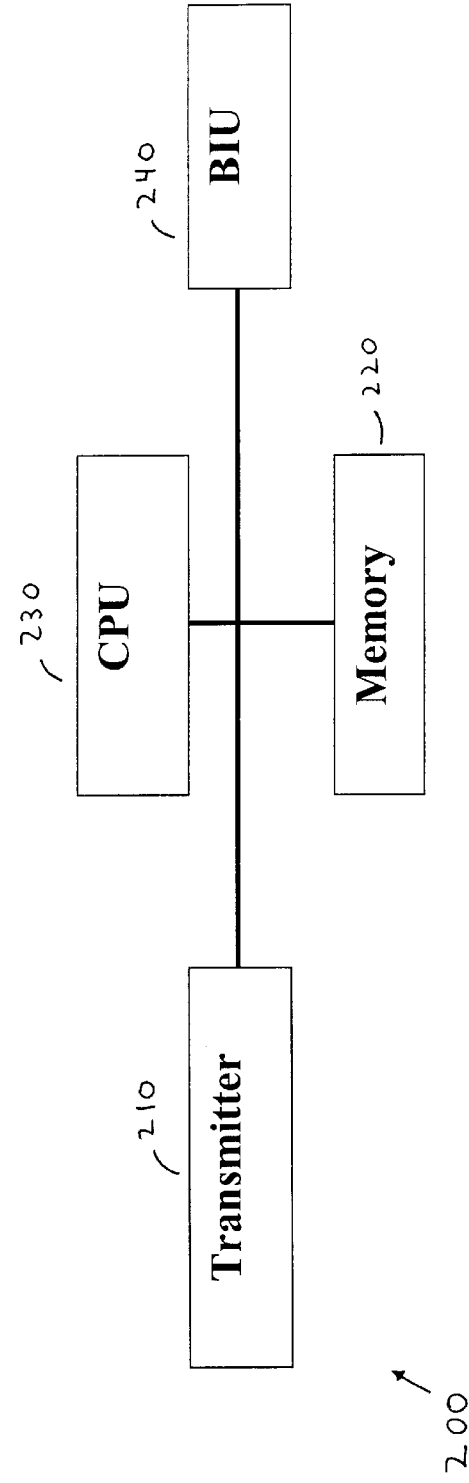
FIG. 2 is a block diagram illustrating a typical IEEE 802.11 compliant device.
Figure 5:
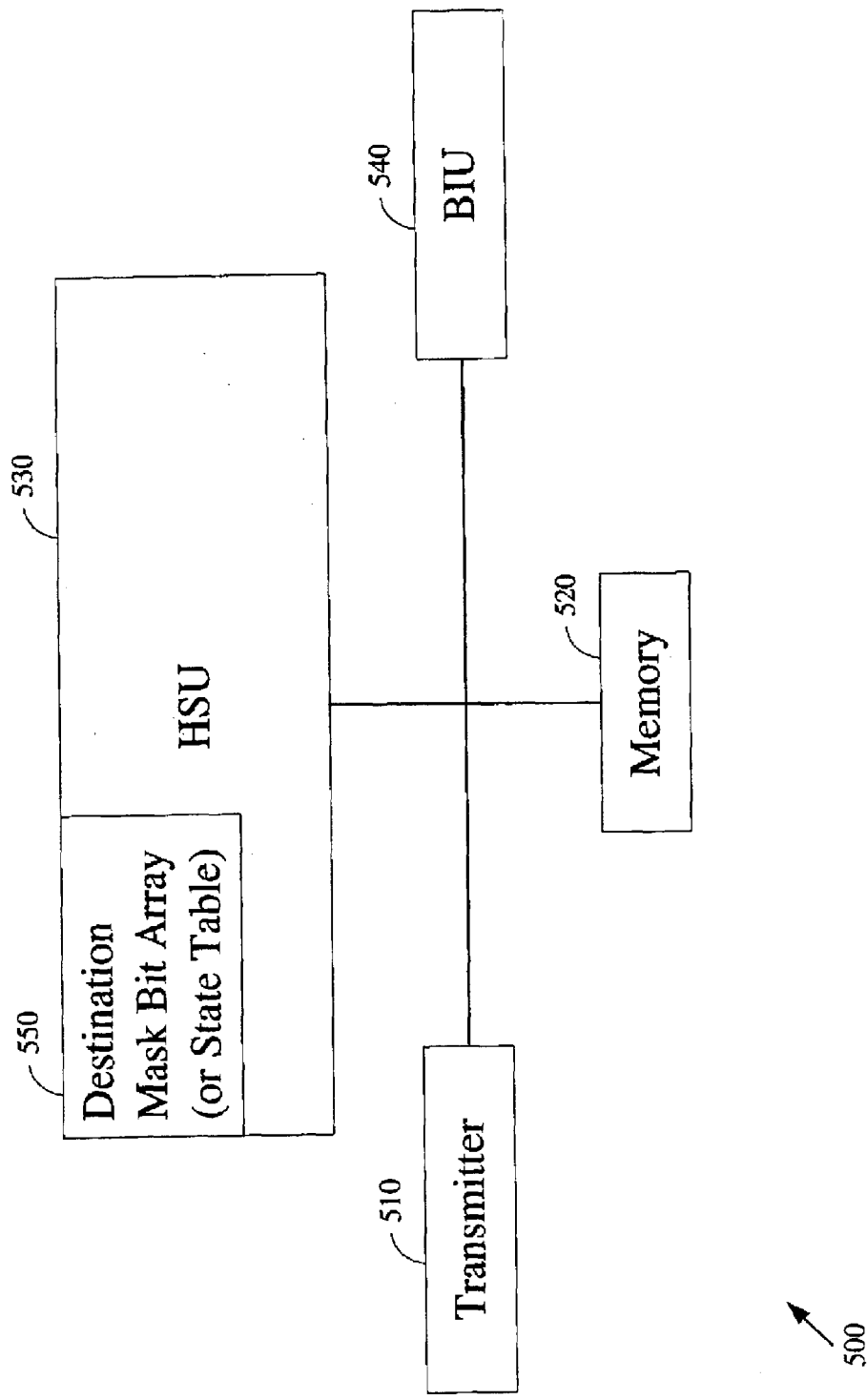
FIG. 5 is a block diagram illustrating a transmission device according to a presently preferred embodiment.

FIG. 5 is a block diagram illustrating an exemplary transmission device 500, such as an access point or a station, according to a presently preferred embodiment. The device 500 includes a transmitter 510, a memory 520, a bus interface unit (BIU) 540, and a combined hardware/software unit (HSU) 530. The HSU 530 transfers data packets from the BIU 540 into the memory 520. In addition, the HSU 530 queues data packets for the transmitter 510 so that the HSU 530 can control the order in which data packets are sent. The HSU 530 replaces the local CPU 230 in a conventional IEEE 802.11 device 200 shown in FIG. 2. The HSU 530 partitions some of the functions and features of the conventional local CPU 230 between hardware and software. The HSU 530 preferably includes functionality of the main host processor on the device 500. The software portion of the HSU 530 preferably includes a device driver that executes on the device 500 of FIG. 5. Preferably, the driver of the HSU 530 creates transmit descriptors for processing of the data packets. Preferably, each data packet has at least one corresponding transmit descriptor. A transmit descriptor describes all or part of a particular data packet to be sent so that the data packet may be sent into the network. A description and explanation of the operation of the data packet transmit descriptors is beyond the scope of this description and will not be presented here so as not to distract from the central concepts herein presented.

Without a transmit blocking mechanism, the HSU 530 may try to send packets out of order. Packet filtering mechanisms are implemented in order to detect and handle situations where filtering may be needed to prevent this. Preferably, the hardware portion of the HSU 530 provides the data packet filtering mechanisms.

If the transmission device 500 has multiple data packets to be sent to several destination nodes it is most efficient to add them to the transmission queue of the device 500 as the data packets arrive. FIG. 6A is a diagram illustrating an exemplary queue 600 of data packets intended for transmission to destinations such as, for example, STA 1 310, STA 2 312, and STA 3 314 of FIGS. 3 or 4. If the first packet for STA 1, STA 1-1, undergoes a failed transmission, it may be desirable to reschedule the data packet for retransmission, but to preserve ordered transmission of data, the device 500 should not send STA 1-2 before the STA 1-1 data packet. Instead, it would be desirable in this event to have the transmission queue 600 become the transmission queue 700 of FIG. 6B. Of course, the orders and destinations of data packets illustrated in FIGS. 6A and 6B are intended merely as examples for illustration purposes and other orders and destinations of data packets may be used.

To satisfy the IEEE 802.11 in-order/ordered delivery requirement yet still allow the HSU 530 to queue multiple data packets to the same destination, the HSU 530 provides a mechanism for dynamically blocking sends to a particular set of destination nodes while continuing to allow sends to other destination nodes to proceed until the HSU 530 indicates that it is safe to resume sending to the blocked destination nodes. In a preferred embodiment, a software device driver of HSU 530 queues the data packets, the hardware portion of the HSU 530 analyzes data packets in order to determine whether transmission of the data packet is permitted, and the device driver of HSU 530 indicates when, if transmission is blocked, transmission is once again permitted.

This is achieved by maintaining a status on each destination address of whether a failed data packet transmission to that destination previously occurred. Subsequent data packets for that destination, after a failed data packet transmission, are only sent if explicit instruction is given to do so. Preferably, each data packet has at least one corresponding transmit descriptor that contains a unique identifier, for example an index, which uniquely represents that destination. A transmit block bit such as a destination mask bit is preferably maintained for each index. It should be understood that while the destination mask bit is preferably stored as an entry in destination transmit block status table such as a destination mask table, in other embodiments the destination mask bit may, for example, be a bit field located in a transmit descriptor corresponding to the data packet. Before sending a data packet to a particular destination the destination mask bit is checked by the device 500 and the data packet is only sent if that bit is clear. If a failed data packet transmission occurs, then the destination mask bit is set and no further packets are sent to that destination. A change destination status code, such as a mechanism to clear the destination mask bit, is preferably provided by including another field in a transmit descriptor, a clear destination mask field, which instructs the hardware to clear the destination mask bit and send the data packet.

More specifically, a destination transmit block status table such as a destination mask bit array 550 is preferably stored as an on-chip array in the hardware portion of the HSU 530 of the device 500. Of course, the destination mask bit array may be stored elsewhere on the device 500. The array 550 serves as an address state table or transmit blocking status table, that is, the bit values stored as entries in the table preferably indicate, for each destination or for each address that identifies the destination, whether or not data packet transmissions should be blocked to that particular destination. Preferably, a destination mask bit indicates a transmission block if the bit is set, that is, equal to one; while transmission is permitted if the destination mask bit is clear, that is, equal to zero. Preferably, the destination mask bits in the state table are initialized to zero. In a presently preferred embodiment, the array 550 stores M entries, the M corresponding to the number of destination nodes to which the device 500 is capable of transmitting data packets. In one embodiment, $M=2^6=64$. Of course, this value is exemplary, and M may take on other values. From the perspective of the transmission device 500, if there are M destination nodes 1, 2, ... M, then any individual one destination node is referred to as the Nth destination node or destination node N. For example, in the wireless communications system 300 of FIG. 3, let the access point AP 320 be the transmission device 500 and the stations 310, 312, 314, ..., 316 be the M destination nodes stations. Then, a data packet transmitted from the AP 320 to the station STA 2 312 is a data packet transmitted to destination node N, preferably as allowed by destination mask bit N, where N=2. The destination mask bit for destination node N is referred to as DestMaskBitN, and the clear destination mask field for destination node N is referred to as ClearDestMaskN in the following description.

Figure 7:
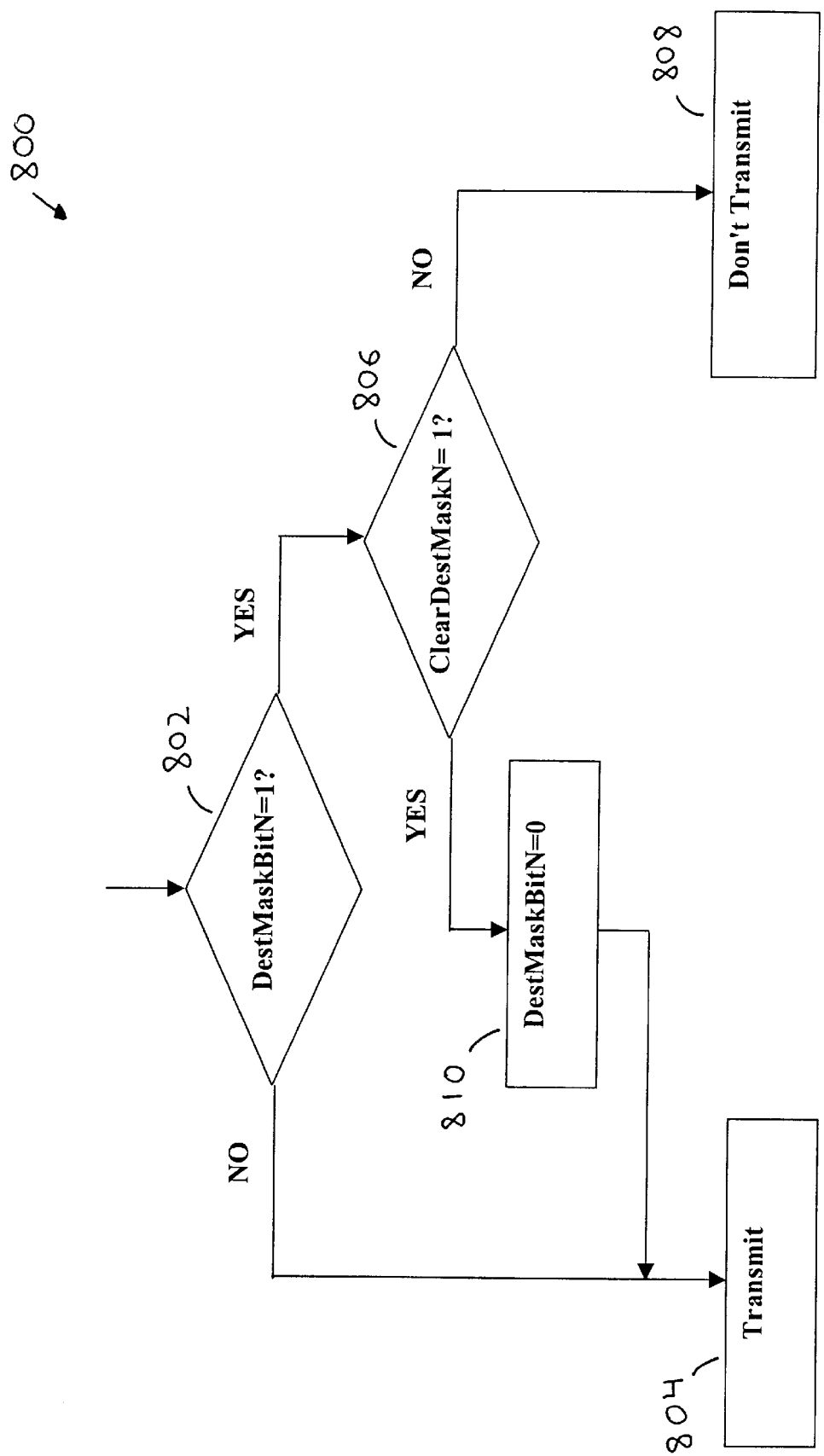
FIG. 7 is a flow diagram illustrating a first exemplary transmit blocking decision structure according to a presently preferred embodiment.

The operation of the transmission device 500 will now be described in more detail with reference to FIG. 7. FIG. 7 is a flow diagram illustrating a first exemplary transmit blocking decision structure 800 according to a presently preferred embodiment and with respect to the transmission device 500. The decision structure 800 covers the fundamental transmit or don't transmit situation for the device 500. Preferably, the HSU 530 software device driver of the transmission device 500 queues data packets for delivery to a plurality of destinations, preferably M destinations. The first data packet in the queue is addressed to destination node N. At step 802, the device 500 determines whether the destination mask bit for the destination node N is clear, or is set. That is, is DestMaskBitN equivalent to 1? If the destination mask bit DestMaskBitN is clear, that is, not equal to one, then processing advances to step 804, and the data packet is transmitted to destination node N. If the destination mask bit is set (DestMaskBitN=1) then processing proceeds to step 806. At step 806, the device 500 determines whether the destination mask bit should be cleared. A field located in a transmit descriptor corresponding to the data packet, ClearDestMaskN, indicates whether or not the destination mask bit should be cleared. If ClearDestMaskN is clear, or not equal to one, then the mask bit should not be cleared, and the processing proceeds to step 808. At step 808, the device 500 does not transmit the data packet to destination node N, since transmission is blocked to destination node N, as indicated by the destination mask bit (DestMaskBitN=1) and no instructions to clear the bit (ClearDestMaskN=0). Returning to step 806, if ClearDestMaskN is set, or equal to one, the mask bit should be cleared, and processing proceeds to step 810. At step 810, the destination mask bit for destination node N is cleared (DestMaskBitN=0), so that the data packet is transmitted to destination node N at step 804.

Example According To FIG. 7

Applying the exemplary queues 600, 700 of FIGS. 6A and 6B to FIG. 7, the transmission device 500, in attempting to process the data packet STA 1-1, would examine the destination mask bit DestMaskBit1 (N=1) at step 802. The device 500 would ascertain that DestMaskBit1 was, for example, clear and the device 500 would attempt to transmit the data packet STA 1-1 at step 804. In a presently preferred embodiment, if the device 500 does not receive an acknowledgement from a destination following transmission of a data packet to that destination, the data packet transmission is a failed transmission. Assuming a failed transmission, the device 500 would set the destination mask bit (DestMaskBit1=1) (not shown). Preferably, the device 500 would then requeue the data packet STA 1-1 after the data packet STA 3-2 while setting ClearDestMask1 (N=1) for the data packet STA 1-1. The data packet STA 1-1 is preferably queued after the data packet STA 3-2 since the packet STA 3-2 is the last packet of the exemplary queue 600 at the beginning of the example. Preferably, data packets to a destination are sent according to their order in the queue and preferably transmissions to one destination are not delayed while a data packet that underwent a failed transmission to another destination is requeued. Next, the transmission device 500 would attempt to process the data packet STA 2-1. The device 500 examines the DestMaskBit2 (N=2) at step 802. The device 500 would ascertain that DestMaskBit2 was, for example, clear and the device 500 would attempt to transmit the data packet STA 2-1 at step 804. Assuming a successful transmission, the device 500 would proceed through the queue of data packets and process data packet STA 2-2, which is transmitted successfully, for example, and then data packet STA 3-1, which is transmitted successfully according to the example. The transmission device 500 would attempt to process the data packet STA 1-2 next in the queue 600, and the device 500 examines the DestMaskBit1 (N=1) at step 802. The device 500 would ascertain that DestMaskBit1 is set after the failed transmission of data packet STA 1-1 and processing of STA 1-2 would proceed to step 806. ClearDestMask1 will be clear for the data packet STA 1-2 and processing proceeds to step 808, and STA 1-2 will not be transmitted. The data packet STA 1-2 would be requeued unchanged, since the device 500 did not attempt to transmit the data packet, after STA 1-1. Next, the device 500 would proceed through the queue of data packets and process data packet STA 3-2, which is transmitted successfully according to the example. The next data packet on the queue to be processed by the device 500 would be the data packet STA 1-1 that earlier underwent a failed transmission. The destination mask bit DestMaskBit1 remains set (step 802), but. ClearDestMask1 is set (step 806) for the data packet STA1-1, so the processing proceeds to step 810. The destination mask bit is cleared (DestMaskBit1=0) and the data packet STA 1-1 is sent. If STA 1-1 transmits correctly, the data packet STA 1-2 would also be sent since the DestMaskBit1 is clear. Thus the desired order shown in the transmission queue 700 of FIG. 6B is achieved.

Figure 8:
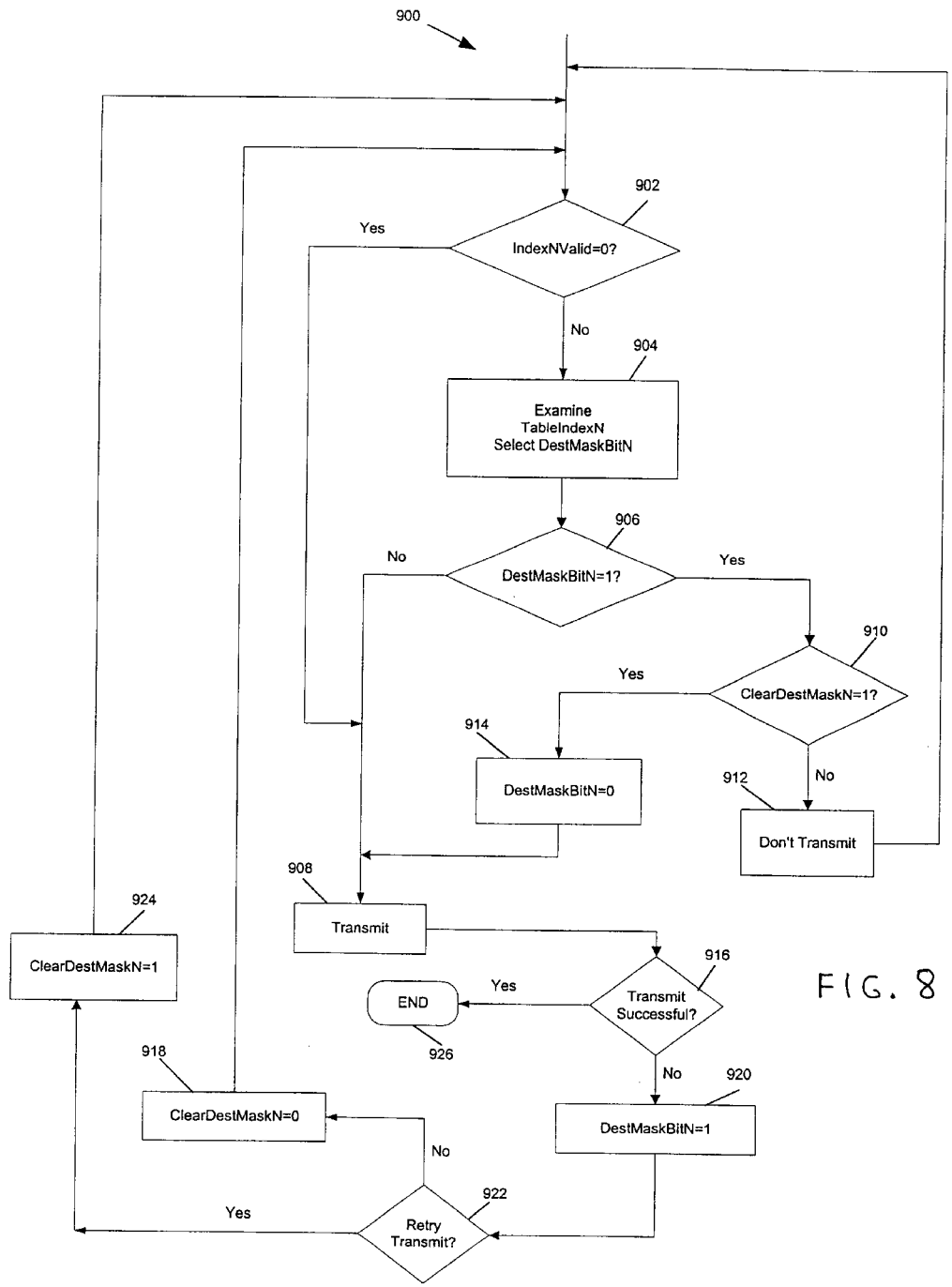
FIG. 8 is a flow diagram illustrating a second exemplary transmit blocking decision structure according to a presently preferred embodiment.

Extended operation of the transmission device 500 will now be described in more detail with reference to FIG. 8. FIG. 8 is a flow diagram illustrating a second exemplary transmit blocking decision structure 900 according to a presently preferred embodiment and with respect to the transmission device 500. The decision structure 900 incorporates similar steps to those of the decision structure 800 of FIG. 7, but preferably the decision structure 900 includes further processing steps to illustrate a more extended view of the operation of device 500 according to this embodiment. Preferably, every data packet to be queued for the transmitter includes fields in a corresponding transmit descriptor to be utilized by the HSU 530 in processing packets according to the decision structure 900. In this exemplary embodiment, the destination mask bits, each corresponding to a particular destination node, are stored in a state table. A generic destination mask bit is referred to as DestMaskBitN, and corresponds to the destination node N. Preferably, the DestMaskBitN applies globally to all data packets targeted to the destination node N. A transmit descriptor corresponding to a generic data packet targeted to the destination node N preferably includes the TableIndexN field. The TableIndexN field is an example of a unique identifier used to specify a unique identifier, for example an index, into the destination mask bit state table to address a particular destination mask bit DestMaskBitN. Preferably, a transmit descriptor corresponding to the generic data packet further includes the IndexNValid field. The IndexNValid field specifies whether the contents of the TableIndexN field are valid and thus can be used to properly index into the state table. Preferably, a transmit descriptor corresponding to the generic data packet further includes the ClearDestMaskN field. The ClearDestMaskN field, preferably consisting of a bit value, if set, instructs the HSU 530 hardware to clear the value of the particular destination mask bit DestMaskBitN in the state table. Preferably, the transmit descriptor fields IndexNValid, TableIndexN, and ClearDestMaskN apply only to the specific data packet in which they are included. That is, two data packets targeted and queued to same destination node N may have different IndexNValid, TableIndexN, and ClearDest- MaskN field values, but at any given time the same DestMaskBitN will be applicable to both data packets.

Preferably, the HSU 530 software device driver of the transmission device 500 queues data packets for delivery to a plurality of destinations, preferably M destinations. The first data packet in the queue is addressed to destination node N. Referring to FIG. 8, at step 902 the HSU 530 hardware inspects the IndexNValid field, for example a bit value, and determines whether the IndexNValid field is clear. That is, "Is IndexNValid field equivalent to zero?" If the IndexNValid field is clear, that is, not equal to one, the index specified in TableIndexN is not valid, and transmit blocking is not enabled, for example. In this event, processing advances to step 908, and the HSU 530 hardware will allow transmission of the data packet to the destination node N. If the IndexNValid field is set, then the TableIndexN field value is valid and processing proceeds to step 904. At step 904, the HSU 530 hardware examines the TableIndexN field. The HSU 530 uses the specified index in the TableIndexN field to index into the state table and select the corresponding destination mask bit DestMaskBitN of the M destination mask bits from the state table preferably stored in the HSU 530 hardware.

The HSU 530 uses the destination mask bit DestMaskBitN to determine whether transmission to the destination node N should be blocked or permitted (since the IndexNValid field is set and the DestMaskBitN is valid). At step 906, the HSU 530 hardware examines the destination mask bit DestMaskBitN and determines whether the destination mask bit for the destination node N is clear, or is set. That is, "Is DestMaskBitN equivalent to 1?"

If the selected destination inask bit is clear (DestMaskBitN=0) at step 906, then processing advances to step 908 where the HSU 530 hardware will allow the data packet to be transmitted to destination node N.

If, however, the destination mask bit is set (DestMaskBitN=1) at step 906, then processing proceeds to step 910. At step 910, the HSU 530 hardware inspects the ClearDestMaskN field in a transmit descriptor corresponding to the data packet and determines whether the destination mask bit should be cleared.

If the ClearDestMaskN field is clear (ClearDestMaskN=0) at step 910, then the destination mask bit should not be cleared, and the processing proceeds to step 912. At step 912, the HSU 530 hardware does not transmit the data packet to destination node N, since transmission is blocked to destination node N, as indicated by the destination mask bit (DestMaskBitN=1) and no instructions to clear the bit (ClearDestMaskN=0). The HSU 530 hardware leaves the destination mask bit set to one. Optionally, the HSU 530 software device driver will ensure that the ClearDestMaskN is clear as the HSU 530 software requeues the data packet.

Returning to step 910, if ClearDestMaskN is set (ClearDestMaskN=1), the mask bit should be cleared, and processing proceeds to step 914. At step 914, the HSU 530 hardware clears the destination mask bit for the destination node N (DestMaskBitN=0), and the HSU 530 hardware allows transmission of the data packet to destination node N at step 908.

At step 916, the HSU 530 determines whether or not transmission of the data packet to the destination node N was successful. If the HSU 530 determines that there was a failed transmission of a data packet, processing advances to step 920, where the HSU 530 hardware sets the corresponding destination mask bit to a one (DestMaskBit=1). This will prevent future data packets to the same destination node N from being sent until the HSU 530 software driver has had time to requeue the data packet that underwent a failed transmission for processing by the HSU 530 hardware.

Proceeding to step 922, the HSU 530 software device driver determines whether or not to retry transmit of the data packet that underwent a failed transmission. If the data packet is to be retransmitted, the HSU 530 software device driver sets the ClearDestMaskN (ClearDestMaskN=1) at step 924. Preferably, the HSU 530 software device driver requeues the data packet ahead of any other packets to the destination node N.

If the data packet is not to be retransmitted, the HSU 530 software device driver clears the ClearDestMaskN bit (ClearDestMaskN=0) at step 918. The HSU 530 software device driver then discards, performs manipulations on, or stores the data packet in memory such as the memory 520 of FIG. 5 for later processing, for example. Preferably, only on the retry of a data packet that underwent a failed transmission will the HSU 530 software driver set the ClearDestMaskN bit to one. For all other transmission attempts, such as non-retries (step 922), or reissues of data packets that were blocked by the destination mask bit (step 912), the HSU 530 software driver will clear the ClearDestMaskN bit (ClearDestMaskN bit=0).

Returning to step 916, if the transmission of the data packet was determined to be successful by the HSU 530, if the device 500 received an acknowledgement from the destination node N for example, the process terminates for that data packet at step 926.

Example According To FIG. 8

Applying the exemplary queues 600, 700 of FIGS. 6A and 6B, to FIG. 8, the transmission device 500, the HSU 530 software device driver queues the data packets according to the queue 600 of FIG. 6A. In attempting to process the data packet STA 1-1, the HSU 530 hardware analyzes the fields of a transmit descriptor corresponding to the data packet STA 1-1. The Index1 Valid (N=1) field is equal to one at step 902, and the HSU 530 hardware selects the DestMaskBit1 (N=1) by using the TableIndex1 (N=1) field to index into the state table. The HSU 530 hardware examines DestMaskBit1 at step 906 and ascertains that DestMaskBit1 is clear. The HSU 530 hardware attempts to transmit STA 1-1 at step 908. In a presently preferred embodiment, if the device 500 does not receive an acknowledgement from a destination following transmission of a data packet to that destination, the data packet transmission is a transmission failure. Assuming the HSU 530 determines that a failed transmission has occurred (step 916), the HSU 530 hardware sets DestMaskBit1=1 at step 920. The HSU 530 generates an interrupt and the HSU 530 software driver determines that STA 1-1 is to be retransmitted (at step 922), sets ClearDestMask1=1 (N=1) at step 924, and requeues the data packet STA 1-1 following the data packet STA 3-2 as shown in queue 700 of FIG. 6B.

With the failed transmission of the first data packet STA 1-1 to destination station STA 1 310, the state table is now updated to indicate that destination station STA 1 310 is presently unavailable for packet traffic from the queue. Data packets that are intended for destination station STA 2 312 or for destination station STA 3 314 would continue to be eligible for transmission but any subsequent data packets that are targeted to STA 1 310 would be ignored and requeued.

Next, the HSU 530 hardware would attempt to process the data packet STA 2-1 from the queue 600 of FIG. 6A. Assume that for STA 2-1 the IndexNValid=0 at step 902 and the TableIndex2 (N=2) is not valid, or no blocking is enabled for STA 2 312 of FIGS. 3 or 4. In this instance, processing proceeds to step 908 where the HSU 530 hardware allows transmission of the data packet to STA 2 312. Assuming the HSU 530 determines at step 916 that STA 2-1 was successfully transmitted, the process ends for STA 2-1 at step 926.

Next, the HSU 530 hardware attempts to process the data packet STA 2-2 from the queue 600. The HSU 530 hardware analyzes the fields of a transmit descriptor corresponding to the data packet STA 2-2. Now assume that for whatever reason the Index2Valid (N=2) field of STA 2-2 is now equal to one at step 902, and the HSU 530 hardware selects the DestMaskBit2 (N=2) by using the TableIndex2 (N=2) field to index into the state table. The HSU 530 hardware examines DestMaskBit2 at step 906 and ascertains that DestMaskBit2 is clear. The HSU 530 hardware attempts to transmit STA 2-2 at step 908. Assuming the HSU 530 determines at step 916 that STA 2-2 was successfully transmitted, the process ends for STA 2-2 at step 926.

Next, the HSU 530 hardware attempts to process the data packet STA 3-1 from the queue 600. Assume that data packet STA 3-1 is transmitted successfully. Next, the HSU 530 hardware attempts to process the data packet STA 1-2 from the queue 600. For STA 1-2, the IndexNValid=1 (step 902) and the TableIndexN allows the HSU 530 hardware to select DestMaskBit1 (N=1). The HSU 530 hardware examines the DestMaskBit1 (N=1) at step 906. The HSU 530 hardware ascertains that DestMaskBit1=1 following the failed transmission of data packet STA 1-1 and processing of STA 1-2 would proceed to step 910. ClearDestMask1 is clear for the data packet STA 1-2 and processing proceeds to step 912, and the HSU 530 hardware blocks the transmit of STA 1-2 to the STA 1 310 of FIGS. 3 or 4. The HSU 530 generates an interrupt and the data packet STA 1-2 would be requeued unchanged by the HSU 530 software device driver, since the HSU 530 hardware did not attempt to transmit the data packet, after STA 1-1 as in queue 700 of FIG. 6B.

Next, the HSU 530 hardware attempts to process the data packet STA 3-2 from the queue 600 of FIG. 6A. The HSU 530 hardware analyzes the fields of a transmit descriptor corresponding to the data packet STA 3-2. The Index3Valid (N=3) field is equal to one at step 902, and the HSU 530 hardware selects the DestMaskBit3 (N=3) by using the TableIndex3 (N=3) field to index into the state table. The HSU 530 hardware examines DestMaskBit3 at step 906 and ascertains that DestMaskBit3 is clear. The HSU 530 hardware attempts to transmit STA 3-2 at step 908. Assuming the HSU 530 determines that a failed transmission has occurred (step 916), the HSU 530 hardware sets DestMaskBit3=1 at step 920. The HSU 530 generates an interrupt and, for whatever reason, the HSU 530 software driver determines that STA 3-2 is not to be retransmitted (at step 922), sets ClearDestMask3=0 (N=3) at step 918, and discards the data packet STA 3-2.

The next data packet on the queue to be processed by the device 500 would be the data packet STA 1-1 that earlier underwent a failed transmission. The destination mask bit DestMaskBit1 remains set (step 906), but ClearDestMask1 is set (step 910) for the data packet STA 1-1, so the processing proceeds to step 914. The destination mask bit is cleared (DestMaskBit1=0) at step 914 and the HSU 530 hardware allows the data packet STA 1-1 to be transmitted. If STA 1-1 transmits correctly, the data packet STA 1-2 would also be sent since the DestMaskBit1 is clear. Thus the desired order shown in the transmission queue 700 of FIG. 6B is achieved.

In the describing the operation of the transmission device 500, functions are attributed to the hardware and the software portions of the HSU 530. It will be understood by those skilled in the arts of computer organization, communications, and networking, that other implementations are possible. For example, hardware may perform a function that herein is attributed to HSU 530 software or to a device driver executing on the device 500, for example. Similarly, software may perform a function that herein is attributed to HSU 530 hardware.

As used herein, the term transmission device is used to intended to refer broadly to the means of transmission as well as to the network entity housing the means of transmission and can encompass a variety of other transmission related features. In accordance with the presently preferred embodiments described herein, a transmission device can be, for example, an access point or a station in a wireless communications network. More broadly, a transmission device includes any IEEE 802.11 compliant device. Of course, the transmission device is not limited to wireless devices and wireless protocol and standard compliant devices.

As used herein, the term failed transmission is most generally intended to refer to an attempt at transmission of a data packet from a first transmission device to one or more other transmission device that, for whatever reason, can be considered a less than acceptable transmission. In a presently preferred embodiment, a failed transmission occurs when the transmission device does not receive an acknowledgement, of receipt of a directed data packet, from a receiver access point or station. A directed data packet is a data packet that is sent directly to a unique destination and thus requires an acknowledgement. Other examples of failed transmission in other embodiments include instances in which a data packet is transmitted from the first transmission device and fails to reach its target destination, or in which a data packet reaches its target destination but is deemed by the error checking functionality at the target destination to include errors or to be otherwise unacceptable.

As used herein, the term transmit management interface is intended to refer to a combination of hardware and software included with a transmission device and coupled or otherwise interfacing with transmissions means. For example, although in one embodiment the transmit management interface includes the HSU 530 of FIG. 5, other processors, processing arrangements, or software implementations, are possible. The transmit management interface may execute, for example, decision structures in accordance with the methods described herein, such as in FIGS. 7 and 8. The transmit management interface may include a state table such as a destination bit mask array 550 according to the presently preferred embodiments or may access, update, or select entries from a state table external to the transmit management interface. The transmit management interface may include data packet ordering functionality, such as data packet queuing, or other data packet manipulation functionality according the presently preferred embodiments or the interface may utilize data packet ordering functionality external to the transmit management interface.

The presently preferred embodiments presented herein allow multiple data packets in the queue for a particular destination. The described embodiments may be used in, for example, any IEEE 802.11 access point or station, while the embodiments and the concepts and principles related thereto may be applied to any networking device requiring in-order delivery of packets. By enabling a transmission device to queue multiple data packets to the same destination, and to queue multiple data packets to other destinations, the embodiments described herein achieve high network throughput, improved performance, and reduced processor utilization while preserving ordered transmission of data packets.

Although the present invention has been particularly described with reference to the preferred embodiments, it should be readily apparent to those of ordinary skill in the art that changes and modifications in the form and details may be made without departing from the spirit and scope of the invention. It is intended that the appended claims include such changes and modifications.

What is claimed is:

1. A transmission device to provide ordered transmission of data packets to a plurality of destinations, comprising:
   transmission means;
   data packet ordering means;
   a state table to store a transmit block status of each destination, each transmit block status indicating whether transmission of data packets to a destination could result in an out of order reception at the destination; and
   a transmit management interface, coupled to the transmission means and the data packet ordering means, to analyze data packets, the transmit management interface determining whether to transmit a data packet targeted to a particular destination or to block transmission of data packets to the particular destination by examining the transmit block status of the particular destination from the state table.

2. The transmission device according to claim 1, wherein each data packet comprises:
   a unique identifier, the unique identifier corresponding to a transmit block status in the state table; and
   a change destination status code to indicate whether the transmit block status of a particular destination in the state table should be modified.

3. The transmission device according to claim 2, wherein the transmit management interface examines the transmit block status by way of the unique identifier, the unique identifier comprising an index.

4. The transmission device according to claim 2, wherein the transmit management interface modifies the transmit block status of a particular destination and transmits a data packet according to the change destination status code of the data packet.

5. The transmission device according to claim 1, wherein the transmit management interface is configured to receive the data packets individually from the data packet ordering means and to forward the data packets to the transmission means.

6. The transmission device according to claim 1, wherein the data packet ordering means comprises:
   a data packet manipulator to queue the data packets and, if necessary, to requeue data packets in accordance with the transmit management interface.

7. The transmission device according to claim 1 wherein the state table comprises a destination mask bit array.

8. The transmission device according to claim 1 wherein the transmission device is an access point in a wireless communications network.

9. The transmission device according to claim 1 wherein the transmission device is a station in a wireless communications network.

10. The transmission device according to claim 9 wherein the wireless communications network is an ad hoc network.

11. A transmission device to provide ordered transmission of data packets to a plurality of destinations, comprising:
    transmission means;
    data packet ordering means;
    a state table to store a transmit block status of each destination, each transmit block status indicating whether transmission of data packets to a destination could result in an out of order reception at the destination; and
    a transmit management interface, coupled to the transmission means, to block transmission of data packets to a first destination while permitting transmission of data packets to a second destination in accordance with the respective transmit block statuses of the first destination and the second destination from the state table.

12. A method of providing ordered transmission of data packets to a plurality of destinations, comprising:
    queuing at least one data packet targeted to a first destination together with at least one data packet targeted to at least one other destination; and
    determining whether or not to transmit a data packet in accordance with a destination transmit block status table and a change destination status code, the destination transmit block status table indicating whether a particular destination has a transmit block, the change destination status code stored in the data packet and indicating whether a transmit block at a particular destination should be maintained.

13. A method of providing ordered transmission of data packets to a plurality of destinations, comprising:
    queuing at least one data packet targeted to one destination together with at least one data packet targeted to at least one other destination;
    blocking further transmission of any data packets to the one destination in the event of a failed transmission of a first data packet targeted to the one destination, the occurrence of such event indicating that the further transmission could result in an out of order reception at the one destination; and
    permitting transmission of at least one other data packet targeted to at least one other destination.

14. The method according to claim 13, further comprising:
    requeuing the first data packet behind at least one other data packet targeted to at least one other destination.

15. The method according to claim 13, further comprising:
    requeuing the first data packet ahead of any other data packets targeted to the one destination.

16. The method according to claim 13, further comprising:
    unblocking transmission of the first data packet to the one destination.

17. The method according to claim 14, further comprising:
    unblocking transmission of the first data packet to the one destination responsively to the first data packet being requeued.

18. The method according to claim 13, further comprising:
    assigning transmission priority to the first data packet ahead of any other data packets targeted to the one destination.

19. The method according to claim 18, further comprising:
    unblocking transmission of the first data packet to the one destination.

20. The method according to claim 19, further comprising:
unblocking transmission of the first data packet to the one destination responsively to the first data packet being assigned transmission priority.

21. The method according to claim 13, further comprising:
designating a second data packet as the next data packet to be transmitted to the one destination; and
unblocking transmission of data packets to the one destination responsively to the second data packet.

22. The method according to claim 21, wherein the second data packet is a data packet from a previous failed transmission to the one destination.

23. The method according to claim 21, wherein the second data packet is a data packet that followed a discarded data packet from a previous failed transmission to the one destination.

24. The method according to claim 21, wherein the second data packet is a modified version of a data packet from a previous failed transmission to the one destination.

25. A method of providing ordered transmission of data packets to a plurality of destinations, comprising:
providing and updating a transmission queue, the transmission queue initially comprising at least one data packet targeted to one destination together with at least one data packet targeted to at least one other destination;
blocking further transmission of any data packets to the one destination in the event of a failed transmission of a first data packet targeted to the one destination, the occurrence of such event indicating that the further transmission could result in an out of order reception at the one destination; and
permitting transmission of at least one other data packet targeted to at least one other destination.

26. The method according to claim 25, further comprising:
repositioning the first data packet and any other data packets targeted to the one destination in the transmission queue.

27. The method according to claim 25, further comprising:
repositioning the first data packet and any other data packets targeted to the one destination in the transmission queue, the first data packet being positioned ahead of any other data packets targeted to the one destination.

28. The method according to claim 25, further comprising:
unblocking transmission of the first data packet to the one destination responsively to the first data packet being repositioned in the transmission queue.

29. The method according to claim 25, further comprising:
repositioning the first data packet and any other data packets targeted to the one destination in the transmission queue while maintaining the relative order of the first and any other data packets targeted to the one destination within the transmission queue.

30. The method according to claim 25, further comprising:
unblocking transmission of the first data packet to the one destination.

* * * * *